United States Patent
Xie et al.

(10) Patent No.: US 11,205,201 B1
(45) Date of Patent: Dec. 21, 2021

(54) METHOD AND SYSTEM FOR ASSEMBLING CONTENT STREAMS WITH ADVERTISEMENTS FROM MULTIPLE ADVERTISEMENT VENDORS

(71) Applicant: DIRECTV, LLC, El Segundo, CA (US)

(72) Inventors: Michael S. Xie, Hacienda Heights, CA (US); Susan B. Chuck, Palos Verdes Estates, CA (US); Parag Agarwal, Long Beach, CA (US); Atanu Basak, Torrance, CA (US); Luan Le-Chau, Los Angeles, CA (US); Connie C. He, San Gabriel, CA (US); Mark T. Takamoto, Hawthorne, CA (US)

(73) Assignee: DIRECTV, LLC, El Segundo, CA (US)

( * ) Notice: Subject to any disclaimer, the term of this patent is extended or adjusted under 35 U.S.C. 154(b) by 1147 days.

(21) Appl. No.: 14/469,154

(22) Filed: Aug. 26, 2014

(51) Int. Cl.
*G06Q 30/00* (2012.01)
*G06Q 30/02* (2012.01)

(52) U.S. Cl.
CPC ..... *G06Q 30/0277* (2013.01); *G06Q 30/0261* (2013.01); *G06Q 30/0269* (2013.01)

(58) Field of Classification Search
CPC .................................. G06Q 30/0207–30/0277
USPC .................................................. 705/14, 319
See application file for complete search history.

(56) References Cited

U.S. PATENT DOCUMENTS

| | | | | |
|---|---|---|---|---|
| 2003/0225900 A1* | 12/2003 | Morishige | ........... | H04L 61/2585 709/230 |
| 2011/0161181 A1* | 6/2011 | Esteve Asensio | ..... | G06Q 30/02 705/14.73 |
| 2012/0078717 A1* | 3/2012 | Smith | .................... | G06Q 30/02 705/14.53 |
| 2014/0040026 A1* | 2/2014 | Swaminathan | ........ | G06Q 30/02 705/14.53 |
| 2014/0172566 A1* | 6/2014 | Zhang | .................... | G06Q 30/02 705/14.54 |
| 2014/0244406 A1* | 8/2014 | Garcia-Martinez | ......................... | G06Q 30/0277 705/14.73 |
| 2014/0379463 A1* | 12/2014 | Sega | .................. | G06Q 30/0247 705/14.46 |
| 2015/0358330 A1* | 12/2015 | Stappenbeck | ....... | G06F 12/1458 711/145 |

* cited by examiner

*Primary Examiner* — Waseem Ashraf
*Assistant Examiner* — Richard G Reinhardt
(74) *Attorney, Agent, or Firm* — Hanley, Flight & Zimmerman, LLC (57) ABSTRACT

A method and system for displaying an advertisement at a user device comprising receiving a content stream at the user device comprising an advertisement queuing point, monitoring the content stream for the advertisement queuing point at a client stream assembler module of the user device, communicating an advertisement query signal comprising client metadata from the client stream assembler module to a decision proxy, receiving an advertisement decision signal comprising an advertisement location identifier at the client stream assembler module, requesting an advertisement based on the advertisement location identifier and receiving and displaying the advertisement corresponding to the advertisement location identifier on a display associated with the user device.

20 Claims, 6 Drawing Sheets

METHOD AND SYSTEM FOR ASSEMBLING CONTENT STREAMS WITH ADVERTISEMENTS FROM MULTIPLE ADVERTISEMENT VENDORS

TECHNICAL FIELD

The present disclosure relates generally to providing advertisements through a content stream and, more specifically, to a method and system for providing replacement advertisements suited for a client to a content stream.

BACKGROUND

The statements in this section merely provide background information related to the present disclosure and may not constitute prior art.

Providing advertisements to users is an important way for businesses using the internet to generate revenue. Content providers provide advertisements to reduce the cost of providing a service. Internet users typically see advertisements placed in a content stream, pop-up ads or banners in or adjacent to content. For streaming content, advertisement (ad) vendors typically provide end to end service that includes advertisement rights management, ad decision making, ad distribution and ad quality measurement. This end to end providing of service typically limits a content provider from being flexible in the use of multiple vendors.

In one known method, an advertisement vendor assembles content from a content provider with various ads. The content and advertisements are then streamed through a network to various user devices that may include mobile devices. Because the advertisement provider provides service in this manner, the content providers are inconveniently bound into using a particular advertisement provider.

SUMMARY

The present disclosure provides a method and system for providing advertisements that are controlled by a mechanism within the user device. This allows the provider the option of using different advertising providers.

In one aspect of the disclosure, a method of displaying an advertisement at a user device includes receiving a content stream at the user device comprising an advertisement queuing point, monitoring the content stream for the advertisement queuing point at a client stream assembler module of the user device, communicating an advertisement query signal comprising client metadata from the client stream assembler module to a decision proxy, receiving an advertisement decision signal comprising an advertisement location identifier at the client stream assembler module, requesting an advertisement based on the advertisement location identifier and receiving and displaying the advertisement corresponding to the advertisement location identifier on a display associated with the user device.

In another aspect of the disclosure, a method of displaying content includes selecting a content at a user device to form a selection signal, receiving a manifest file comprising a plurality of chunk location identifiers respectively corresponding to a plurality of content chunks, requesting the chunks based on the chunk identifiers, communicating a content stream based on the chunks to the user device comprising an advertisement queuing point, monitoring the content stream for the advertisement queuing point at a client stream assembler module of the user device and communicating a first advertisement decision query signal comprising client metadata from the client stream assembler module to a decision proxy. The advertisement decision query signal includes a first configuration. The method further includes changing, at the decision proxy, the first configuration of the first advertisement decision query signal to a second advertisement decision query signal having a second configuration at the decision proxy, communicating the second advertisement decision query to an advertisement decision system, generating an advertisement decision signal comprising an advertisement location identifier at the advertisement decision system, communicating the advertisement decision signal to the decision proxy, communicating the advertisement decision signal from the decision proxy to the client stream assembler module, replacing one of the chunk location identifiers in the manifest with the advertisement location identifier, requesting an advertisement based on the advertisement location identifier, and receiving and displaying the advertisement on a display associated with the user device.

In a further aspect of the disclosure, a user device includes a display and a client stream assembler module receiving a content stream comprising an advertisement queuing point, monitoring the content stream for the advertisement queuing point, communicating an advertisement decision query signal comprising client metadata from the client stream assembler module to a decision proxy, receiving an advertisement decision signal comprising an advertisement location identifier, requesting an advertisement based on the advertisement location identifier from a second content delivery network and receiving and displaying the advertisement on a display associated with the user device.

In yet another aspect of the disclosure, a user device generates a selection signal corresponding to content, receives a manifest file comprising a plurality of chunk location identifiers respectively corresponding to a plurality of content chunks in response to the selection signal and requests the chunks based on the chunk identifiers. A first content delivery network communicates a content stream based on the chunks to the user device comprising an advertisement queuing point. The user device monitors the content stream for the advertisement queuing point and communicates a first advertisement decision query signal comprising client metadata to a decision proxy. The advertisement decision query signal comprises a first configuration. The decision proxy changes the first configuration of the first advertisement decision query signal to a second advertisement decision query signal having a second configuration and communicates the second advertisement decision query to an advertisement decision system. The advertisement decision system generates an advertisement decision signal comprising an advertisement location identifier and communicating the advertisement decision signal to the decision proxy. The decision proxy communicates the advertisement decision signal from the decision proxy to the user device. The user device replaces one of the chunk location identifiers in the manifest with the advertisement location identifier and requests an advertisement based on the advertisement location identifier and receives and displays the advertisement on a display associated with the user device.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses. For purposes of clarity, the same reference numbers will be used in the drawings to identify similar elements. As used herein, the term module refers to an application specific integrated circuit (ASIC), an electronic circuit, a processor (shared, dedicated, or group) and memory that execute one or more software or firmware programs, a combinational logic circuit, and/or other suitable components that provide the described functionality. As used herein, the phrase at least one of A, B, and C should be construed to mean a logical (A or B or C), using a non-exclusive logical OR. It should be understood that steps within a method may be executed in different order without altering the principles of the present disclosure.

The teachings of the present disclosure can be implemented in a system for communicating content to an end user or user device. Both the data source and the user device may be formed using a general computing device having a memory or other data storage for incoming and outgoing data. The memory may comprise but is not limited to a hard drive, FLASH, RAM, PROM, EEPROM, ROM phase-change memory or other discrete memory components.

Each general purpose computing device may be implemented in analog circuitry, digital circuitry or combinations thereof. Further, the computing device may include a microprocessor or microcontroller that performs instructions to carry out the steps performed by the various system components.

A content or service provider is also described. A content or service provider is a provider of data to the end user. The service provider, for example, may provide data corresponding to the content such as metadata as well as the actual content in a data stream or signal. The content or service provider may include a general purpose computing device, communication components, network interfaces and other associated circuitry to allow communication with various other devices in the system.

Further, while the following disclosure is made with respect to the delivery of video (e.g., television (TV), movies, music videos, etc.), it should be understood that the systems and methods disclosed herein could also be used for delivery of any media content type, for example, audio, music, data files, web pages, advertising, etc. Additionally, throughout this disclosure reference is made to data, content, information, programs, movie trailers, movies, advertising, assets, video data, etc., however, it will be readily apparent to persons of ordinary skill in the art that these terms are substantially equivalent in reference to the example systems and/or methods disclosed herein. As used herein, the term title will be used to refer to, for example, a movie itself and not the name of the movie.

While the following disclosure is made with respect to example DIRECTV® broadcast services and systems, it should be understood that many other delivery systems are readily applicable to disclosed systems and methods. Such systems include wireless terrestrial distribution systems, wired or cable distribution systems, cable television distribution systems, Ultra High Frequency (UHF)/Very High Frequency (VHF) radio frequency systems or other terrestrial broadcast systems (e.g., Multi-channel Multi-point Distribution System (MMDS), Local Multi-point Distribution System (LMDS), etc.), Internet-based distribution systems, cellular distribution systems, power-line broadcast systems, any point-to-point and/or multicast Internet Protocol (IP) delivery network, and fiber optic networks. Further, the different functions collectively allocated among a service provider and integrated receiver/decoders (IRDs) as described below can be reallocated as desired without departing from the intended scope of the present patent.

Figure 1:
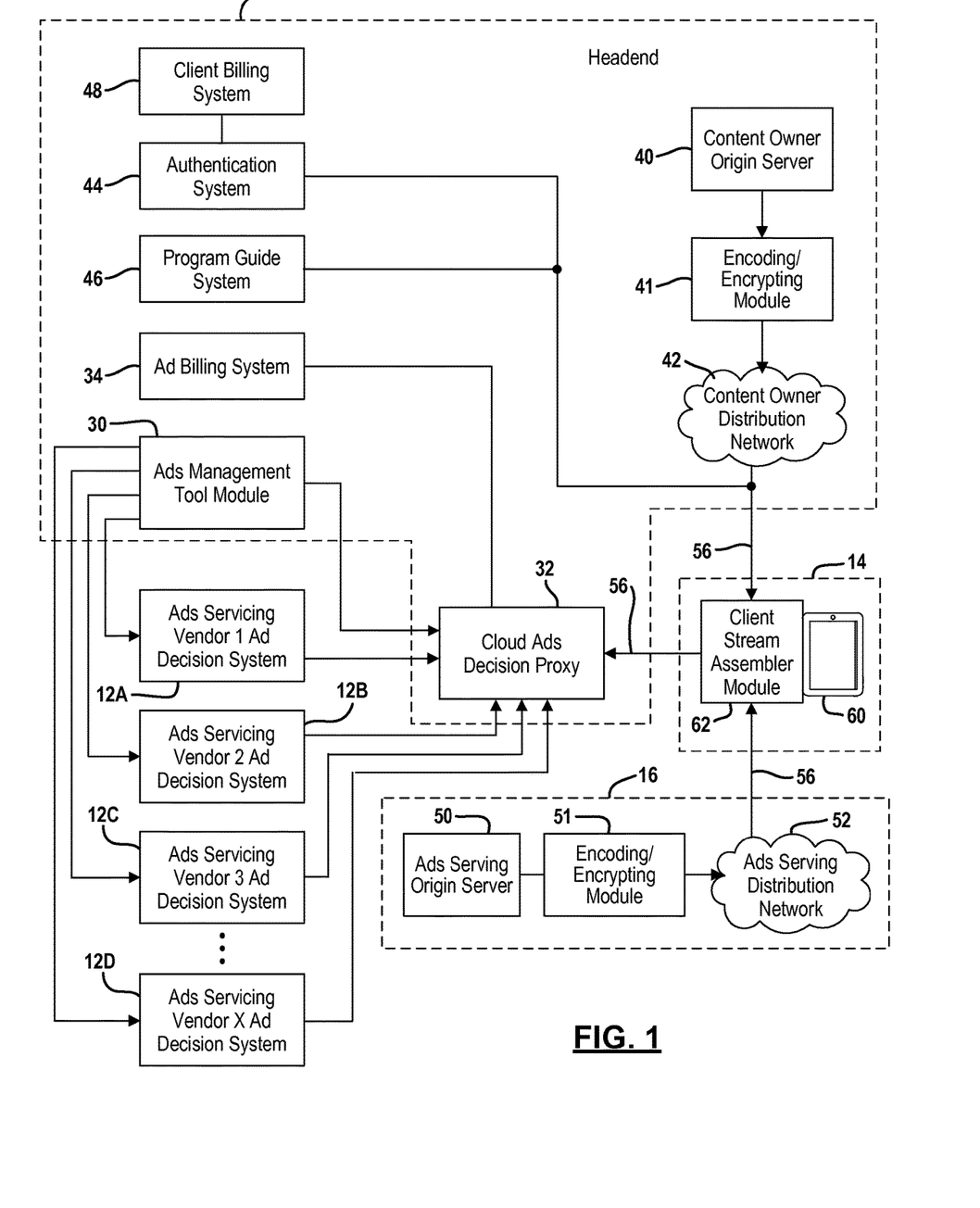
FIG. 1 is a high level block diagrammatic view of the ad delivery system according to the present disclosure.

Referring now to FIG. 1, a head end 10 is illustrated relative to a plurality of advertisement (ad) decision systems 12A-12D. Collectively, the ad decision systems are referred to as reference numeral 12. The head end 10 in combination with the ad decision systems 12A-12D provide content and advertisements to the user device 14. The user device 14 may be a mobile device such as a phone, tablet or laptop computer. The ad decision systems 12A-12D represent individual advertisement servicing vendors that may provide content through an advertisement content delivery network 16. One or more advertisement content delivery networks 16 may be provided in any system.

The head end 10 may include an ads management tool module 30 that is in communication with each of the ad decision systems 12. The ads management tool module 30 may be used to distribute video advertisement rights information to the multiple ad decision systems of the advertisement vendors. The ads management tool module 30 may, for example, provide decision data to allow the ad decision system 12 to make decisions as to which advertisements are to be provided. The region data may be provided so that various ads may be provided to various geographic regions. Other streaming sessions and decision related data, such as channel and program content ID, user profiles, and/or viewing history, can also be provided for targeted ads decision. The ads management tool module 30 may also communicate to the ads decision system various types of application interfaces to be used. A cloud ads decision proxy 32 may also be included within the head end 10. The cloud ads decision proxy 32 communicates with the ad decision systems 12. Ultimately, the cloud ads decision proxy 32 is in communication with the user device 14. The cloud ads decision proxy 32 may receive an advertising query signal from the user device 14 and receives an advertisement decision signal that comprises an advertisement locator identifier such as a uniform resource locator to the user device 14 for a selected advertisement. The cloud ads decision proxy 32 may also keep track of what is played so that the advertisers are properly billed. The cloud ads decision proxy 32 may receive the client metadata from the user device 14 and provide the metadata to the ads decision systems 12 so that an ad decision may be made by the ad decision system 12A-12D. The cloud ad decision proxy 32 also shields the mobile device from the complications of communicating with many different ad decision systems 12. The various ad decision systems 12A-12D may not communicate in standard formats. The cloud ads decision proxy 32 thus acts as an intermediary between the user device 14 and the ad decision systems 12A-12D. That is, the cloud ad decision proxy 32 may change the configuration or format to a second format recognizable by the chosen one of the ad decision systems 12. The decision proxy 32 may also translate content formats or configurations of data from the ad decision systems 12 into formats or configurations recognized by the user device 14.

An advertisement billing system 34 may be in communication with the cloud ad decision proxy 32. The cloud ad decision proxy 32 keeps track of the advertisements that are provided to the user device 14 based on the decisions made by the ad decision systems 12A-12D. The ad billing system 34 allows the proper advertiser to be billed for the advertisements viewed at the user device 14. A billing signal with an advertisement identifier may be communicated to the ad billing system.

Content is provided to the user device 14 from the head end 10 from the content owner origin server 40 and the content owner distribution network 42. The content owner distribution network 42 may be referred to as a content delivery network (CDN). The content delivery network 42 may provide the content through various servers to the user device 14 through a communication network 56. The content owner distribution network 42 may not be located entirely within the head end 10. Content delivery networks may be contracted to provide the function of the content owner distribution network 42.

An encoding/encrypting module 41 may encode and or encrypt the content signal prior to distribution. The encoding/encrypting module 41 may be encoded or encrypted in various formats or by various algorithms.

Advertisement content delivery network 16 may include an advertisement serving origin server 50 and an ad serving distribution network 52. Although only one origin server 50 and one ad serving distribution network 52 are illustrated, multiple origin servers 50 and ad serving distribution network 52 may be provided. Each advertisement provider may have a separate advertisement content delivery network. Further, all the advertisements may be contained within one common content delivery network. Such distinctions may be made based upon various business requirements and system parameters. Ultimately, the one or many advertisement content delivery networks 16 provide advertisements to the user device 14. The user device 14 is unaware of one or more advertisement CDN's because an address or location is provided. It is also possible for the advertisement content delivery network 16 to be the same content delivery network for distributing the streaming programming content.

An encoding/encrypting module 51 may encode and or encrypt the advertisement signal prior to distribution. The encoding/encrypting module 51 may be encoded or encrypted the same as the content stream the encoding/encrypting module 41 as described above. Because advertisements are less restricted in terms of rights, they may also be provided without encrypting or decoding.

The user device 14 is illustrated having a screen display 60 and a client stream assembler module 62.

The head end 10 may also include an authentication system 44. The authentication system 44 may be used to authenticate the user device when first contacting the head end 10 such as when ordering content. The authentication system 44 may provide authentication in various ways, including reviewing user device identifiers and/or passwords. The authentication system 44 generates an authorization signal to allow content streaming to commence.

A program guide system 26 may also be included within the head end 10. The program guide system 46 may be used to communicate program guide data to various devices such as the user device 14. The program guide system 46 may provide a list of content available for streaming to the user device 14.

A client billing system 48 may be in communication with the authentication system 44. The client billing system 48 may receive a communication from the user device 14 and bill the client for requesting streaming content. Of course, various ways to pay for content may be set forth. The user device 14 may be billed or a credit card or other type of instant monetary payment may be made electronically.

The communication network 56 such as the internet or a wireless telephone network may be used to communicate data and content between the user device 14, the ad content delivery network 16, the content owner distribution network 42 and the cloud ads decision proxy 32.

Figure 2:
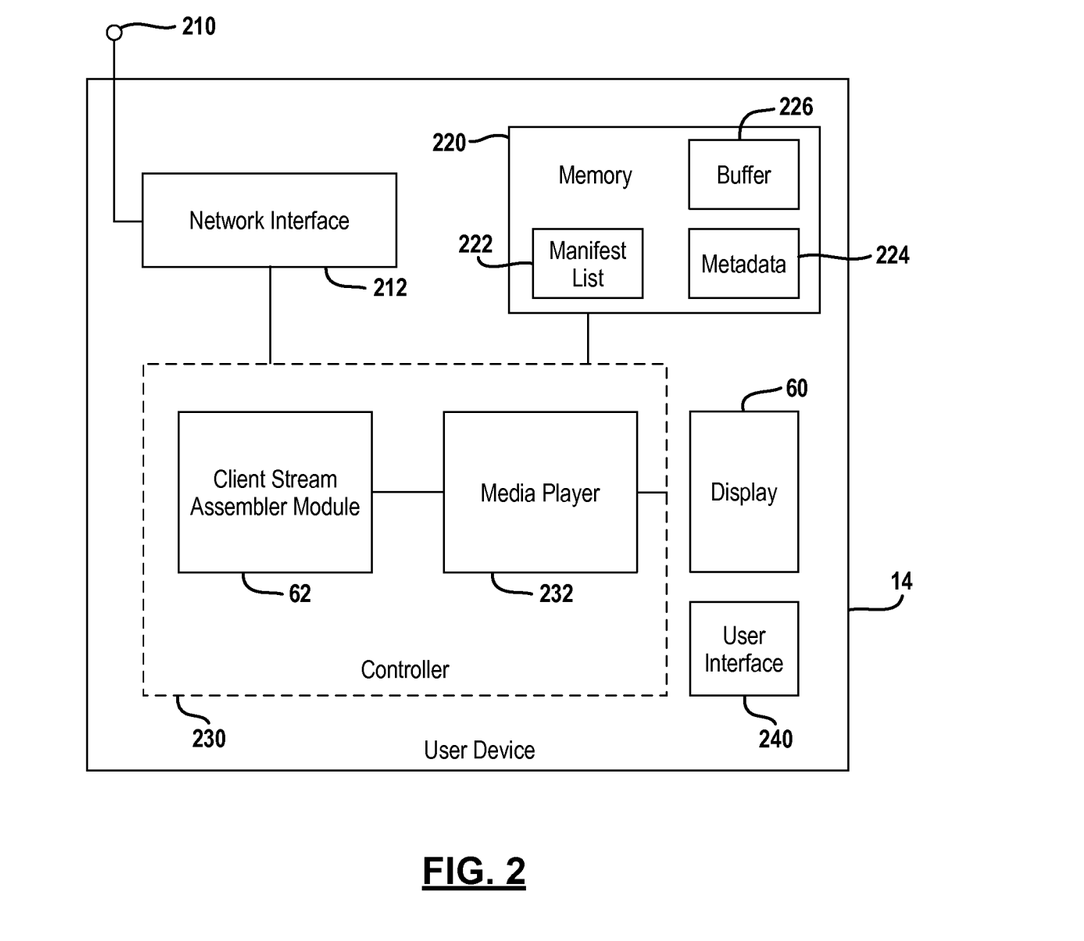
FIG. 2 is a high level block diagrammatic view of the user device according to the present disclosure.

Referring now to FIG. 2, the user device 14 is illustrated in further detail. The user device 14 may include an antenna 210 that is in communication with a network interface 212. The antenna 210 and network interface 212 may depend upon the type of connection thereto. For example, the network interface 212 may be a local area network interface through WiFi. The network interface 212 may also be an interface through a cellular phone communication system such as 4G. The network interface 212 may also allow the user device 14 to connect to multiple types of user devices.

The user device 14 may include a memory 220 that has multiple purposes. The memory 220 may store a manifest list 222, user device metadata 224 and may act as a buffer 226 for streaming content. An example of a manifest list 222 is set forth in FIGS. 3A and 3B below. The manifest list 222 provides a plurality of content identifiers for content and advertisements alike. The manifest list 222 may be provided to the user device 14 after the user device 14 requests streaming content from the head end 10. The metadata 224 may include metadata regarding the user device 14 and the user account. The user device type may be provided in the metadata 224. The metadata 224 may also include a location identifier corresponding to the current location of the user device, a billing location corresponding to the residence of the user, client specific data such as likes or dislikes (in a user profile or the like) and other data that may be used by the ad decision systems 12 for determining an advertisement suitable for the user.

A controller 230 may include the client stream assembly module 62 and a media player 232. The media player 232 is in communication with the display 60.

The client stream assembler module 62 is used to assemble a client stream in the manner set forth below. In particular, the client stream assembler module 62 may receive a manifest list and, upon the detection of an ad queuing point, request an ad for substitution into the manifest list by contacting the cloud ads decision proxy. The cloud ads decision proxy is contacted by the client stream assembler module 62 with an advertisement request signal that comprises client metadata. An advertisement decision signal is communicated to the client stream assembler module 62 with a replacement URL to be inserted within the manifest file so that an advertisement may be substituted for a portion of the streaming content. At the appropriate time, the client stream assembler module 62 retrieves an ad from the ad serving distribution network 52 illustrated in FIG. 1 to obtain the proper advertisement located at the advertisement location corresponding to the advertisement locator identifier or URL.

A user interface 240 may be used to provide various inputs to the user device. The user interface may, for example, be a keyboard. The user interface 240 may also be a pointer or touch screen display. The user, through interaction with the user interface 240, provides an input signal to the user device for performing various functions such as selecting content. Once content is selected, the head end may communicate the content to the user device through a network.

Figure 3A:
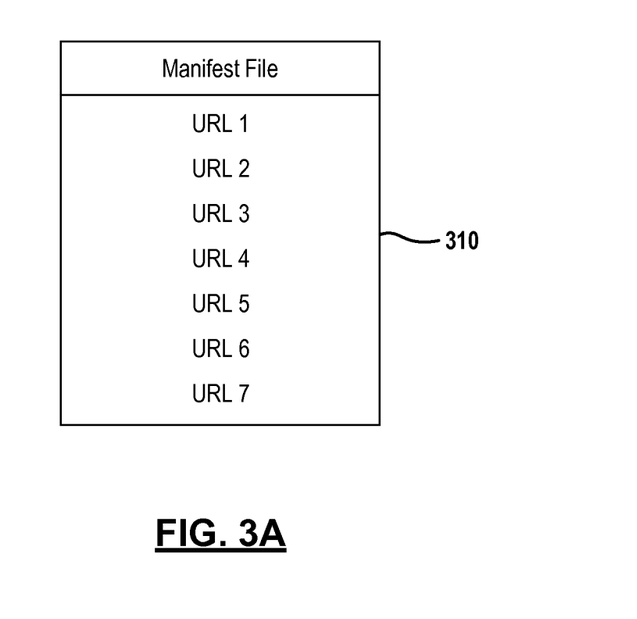
FIG. 3A is a representation of a manifest file.

Referring now to FIG. 3A, a manifest file 310 is illustrated. The manifest file 310 illustrates a plurality of content location identifiers such as URL 1-URL 7. Each URL corresponds to a chunk of streaming content. The URL corresponds to one portion of content or an advertisement. The URLs in FIG. 3A are provided by the content owner distribution network 42 of FIG. 1. Default advertising may be contained in one or more URL's. In this example, default advertising is located at URL 3 and URL 6. Absent substitution, the advertisements URL 3 and URL 6 will be played out. The URL's are used by the user device 14 to obtain the next content chunk.

Figure 3B:
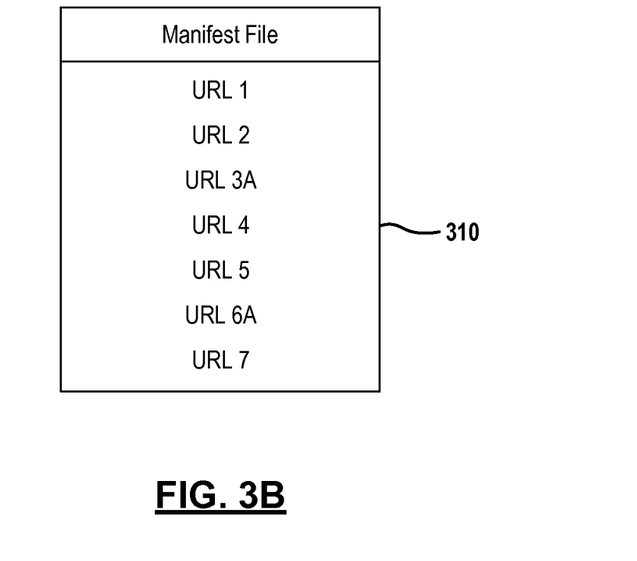
FIG. 3B is a representation of the manifest file of FIG. 3A altered with advertisements therein.

Referring now to FIG. 3B, the manifest file 310 is illustrated having a modified URL at positions URL 3 and URL 6. That is, URL 3 and URL 6 of FIG. 3A have been changed to URL 3A and URL 6A. URL 3A and URL 6A correspond to the location of replacement advertising that are used to replace the default advertising provided by the content owner of the content delivery network. Thus, URL 3A is an advertisement location corresponding to the location of an advertisement used by the mobile device to retrieve the ad. Likewise, URL 6A is also an advertisement location identifier.

Figure 4:
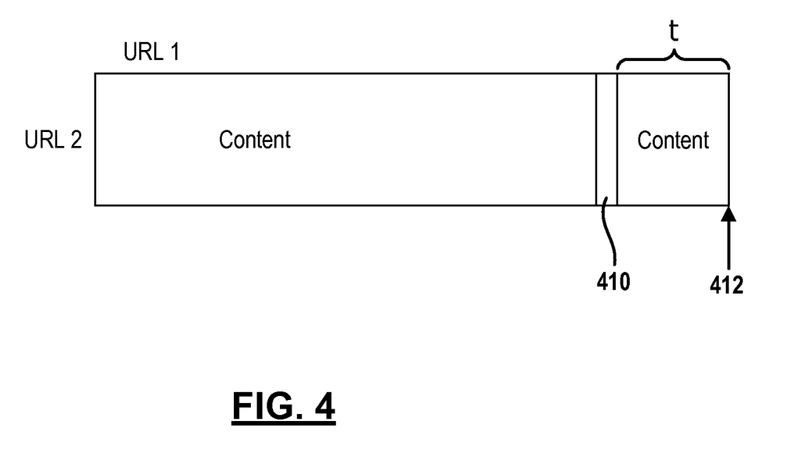
FIG. 4 is a representation of a content chunk.

Referring now to FIG. 4, a representation of URL 2 is illustrated. In this example, URL 2 includes a plurality of content packets and an ads queuing point. The ads queuing point 410 is located a predetermined time "t" before the end 412 of the chunk represented by URL 2. The time t allows enough time for the user device 14 to contact the cloud ads decision proxy to request an advertisement and for the mobile device to receive an advertisement location identifier and contact the advertisement content delivery network to receive the advertisement from the advertisement location identifier. The advertisement may be requested so that at least some of the advertisement may be stored within the buffer prior to playout. Further, the time t allows the manifest to be updated with the advertisement location identifier.

Figure 5:
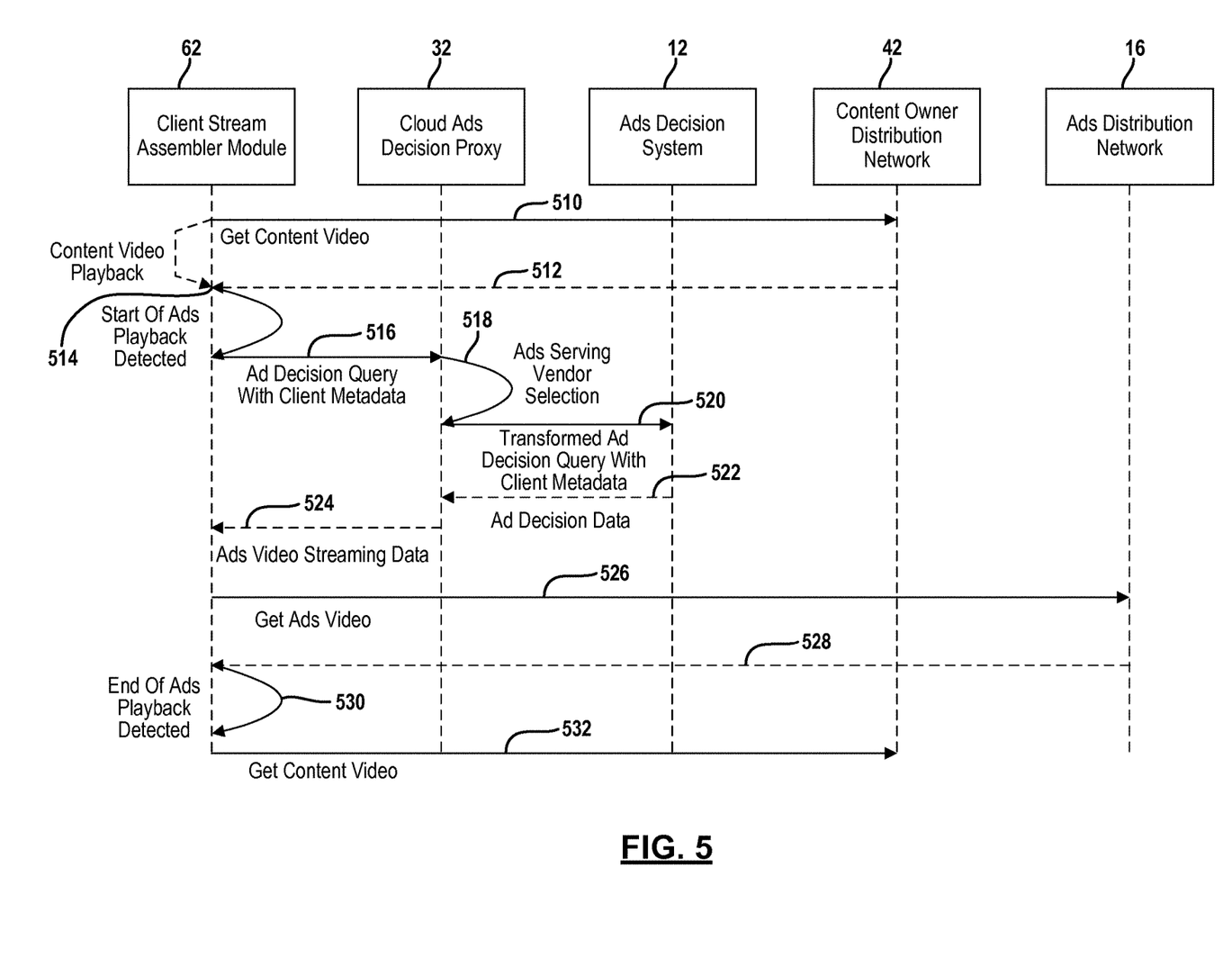
FIG. 5 is a signal diagram of a method for providing advertisements to a user device.

Referring now to FIG. 5, a signal exchange diagram between the various components as illustrated in FIG. 2 is set forth. In step 510, content is requested using a URL for a particular chunk in step 510. The content is requested from the content owner distribution network 42. In response thereto, the content owner distribution network 42 communicates content to the client stream assembler module 62. At point 514 during the playback of the content an ads query point is detected. At the ads query point 514 an ad decision query signal is communicated with the client metadata to the cloud ads decision proxy 32 in step 516. The cloud ads decision proxy 32 uses various business rules to select an advertising service vendor in step 518. The business rules that apply to selecting the ad servicing vendor may include the price of content, the technology available, the type of content desired for the particular user. In step 520, based upon the vendor selection, a transformed ad decision query is communicated to the ads decision system 12 in step 520.

In step 522 ad decision data is communicated from the ads decision system 12 to the cloud ads decision proxy 32. The cloud ads decision proxy 32 then communicates an ads video streaming data signal 524 to the client assembler module 62. The ads video streaming data may comprise an address or location for the advertisement to be inserted in place of the predetermined advertisement communicated with the content stream.

In step 526, a get advertisement video signal is communicated to the ads distribution network corresponding to the location provided in step 524. In step 528 the advertisement is streamed from the ad distribution network 16 to the client stream assembler module 62. In step 530 when the end of the ad is detected, the content is again retrieved from the content owner distribution network 42 in step 532.

Figure 6:
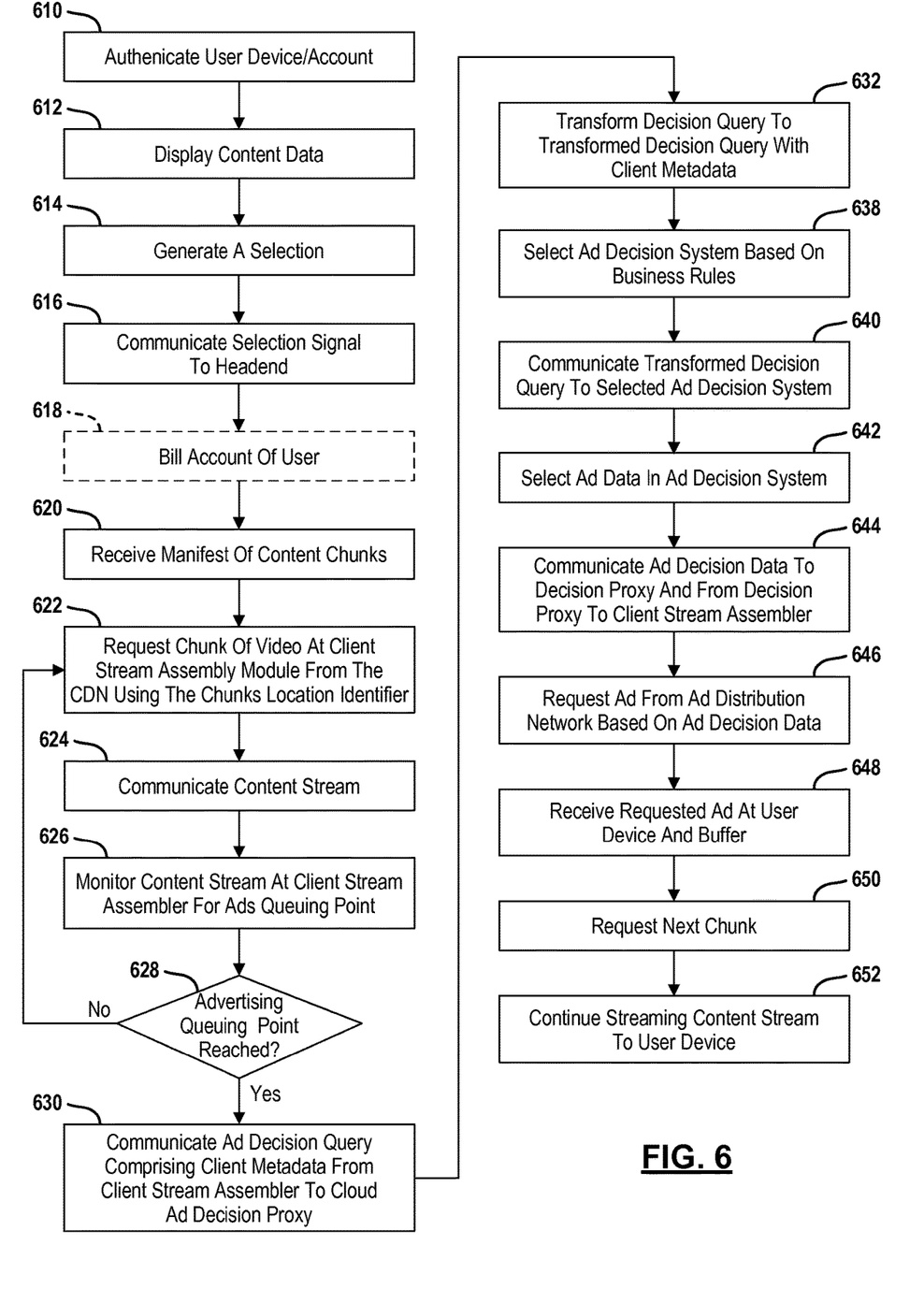
FIG. 6 is a detailed flowchart of a method for providing content advertising to a user device.

Referring now to FIG. 6, a detailed flow chart of a method for providing advertisements is set forth. In step 610 the user device and/or account is authenticated. To obtain streaming services, the user may sign in through the use of a user identifier and/or a password. A token may also be used. Authentication of the user may take place through the authentication system 44 of the head end 10. After authentication, the user may be provided with data corresponding to content available. Content available for streaming may be provided through the program guide system 46 of the head end 10. Content is displayed at the user device in step 612. In step 614, a selection signal corresponding to a selected content is performed. A selection of content may be performed by interfacing with a touch screen or other type of user interface 62 of the user device 14. In step 616, the selection signal is communicated to the head end. The client billing system 48 illustrated in FIG. 2 charges the users account with the system in step 618.

In step 620, the head end provides the user device with a manifest of content chunks location identifiers. The content is separated into a plurality of chunks that have a plurality of packets therein. Each chunk, for example, may provide several minutes of playback time on the user device. Each chunk has a separate content location identifier such as a URL. The location identifier for each chunk may be referred to as a chunk location identifier. In step 622, the client stream assembler module 62 requests content from the first content or chunks location identifier set forth in the content manifest. The content stream of the chunk content may be requested during playback from the media player 232 of FIG. 2. In step 624 the content delivery network, such as the content owner distribution network 42 of FIG. 1, communicates the content stream for the first chunk to the user device. The media player displays the content at the user device on the display associated therewith.

In step 626, the content stream is monitored for an ads queuing point. In step 628, when an ads queuing point is not reached, the system repeats steps 622 through 626 requesting subsequent chunks and continually monitoring the stream. In step 628, if the advertising queuing point has been reached, step 630 communicates an ad decision query signal comprising client metadata from the client stream assembler to the cloud ads decision proxy. In step 632, the decision query may have its format or configuration transformed, if required, so that it may be communicated to the ad decision system in a format or configuration suitable for use. In step 638, the ad decision system is selected based upon business rules as described above. The client metadata may also be used in the selection of the ad decision system. In step 640, the decision query, which has been transformed if required, is communicated to the selected ad decision system. The advertisement data may be selected based on the client metadata. In step 640, advertisement data is selected within the ad decision system. The advertisement data may comprise a location of the advertisement in an ad content delivery network. The ad data is used to form an ad decision signal. In step 644, the ad decision signal is communicated to the ad decision proxy and ultimately to the client stream assembler of the user device.

In step 646, the client stream assembler uses the location data of the ad decision signal for the selected advertisement to communicate with the appropriate ad content distribution network to request communication of the selected advertisement thereto. In step 648, the requested ad is streamed to and received at the user device. The user device may buffer all or part of the advertisement.

In step 650, the next chunk is requested by the user device at or near the end of the advertising chunk. In step 652, the content is continued to be streamed in chunks to the user device through the content stream assembler module according to the manifest. Should any chunks require replacement for advertisement, the same process is followed.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification and the following claims.

What is claimed is:

1. A method of displaying an advertisement at a user device comprising:
   selecting a content at the user device to form a selection signal;
   receiving a manifest file comprising a plurality of chunk location identifiers respectively corresponding to a plurality of content chunks at the user device, wherein a first chunk location identifier of the plurality of chunk location identifiers corresponds to a first portion of the content, and a second chunk location identifier of the plurality of chunk location identifiers corresponds to a default advertisement;
   requesting, at the user device, a first chunk of the content based on the first chunk location identifier;
   communicating a content stream comprising the first chunk of the content to the user device, wherein the content stream comprises an advertisement queuing point at a predetermined time before an end of the first chunk of the content;
   monitoring the content stream for the advertisement queuing point at a client stream assembler module of the user device;
   responsive to reaching the advertisement queuing point, communicating a first advertisement decision query signal comprising client metadata from the client stream assembler module to a decision proxy, said first advertisement decision query signal comprising a first configuration, said client metadata comprising at least one of a user device type, a location of the user device, a billing location and user likes and dislikes;
   selecting, by the decision proxy, a first advertisement decision system from a plurality of advertisement decision systems based on a type of content desired for a user;
   changing, at the decision proxy, the first configuration of the first advertisement decision query signal to a second advertisement decision query signal having a second configuration suitable for use by the first advertisement decision system;
   communicating the second advertisement decision query signal from the decision proxy to the first advertisement decision system with the client metadata, said first advertisement decision system located remotely from the user device and the decision proxy;
   generating an advertisement decision signal comprising an advertisement location identifier at the first advertisement decision system in response to the second advertisement decision query signal and the client metadata;
   communicating the advertisement decision signal from the first advertisement decision system to the decision proxy;
   tracking, at the decision proxy, an advertisement corresponding to the advertisement location identifier to form a tracked advertisement;
   communicating the advertisement decision signal from the decision proxy to the client stream assembler module;
   replacing the second chunk location identifier in the manifest with the advertisement location identifier;
   requesting the advertisement based on the advertisement location identifier; and
   receiving and storing at least a portion of the advertisement in a buffer prior to display of the advertisement on a display associated with the user device, wherein the predetermined time before the end of the first chunk of the content is based on allowing enough time for the user device to communicate the first advertisement decision query signal to the decision proxy and receive and store at least the portion of the advertisement in the buffer prior to display of the advertisement on the display associated with the user device.

2. The method as recited in claim 1 wherein the selecting the first advertisement decision system from the plurality of advertisement decision systems comprises selecting the first advertisement decision system based on a plurality of business rules at the decision proxy, wherein the type of content desired for the user is one of the plurality of business rules.

3. The method as recited in claim 1 wherein the generating the advertisement decision signal comprises generating the advertisement decision signal in response to the client metadata.

4. The method as recited in claim 1 wherein the selecting the first advertisement decision system is based on the client metadata and business rules.

5. The method of claim 1 wherein:
   the type of content desired for the user comprises audio as the type of content;
   said decision proxy selecting the first advertisement decision system from the plurality of advertisement decision systems based on audio as the type of content desired for the user;
   the client metadata comprises a user device type; and
   the generating the advertisement decision signal comprises generating the advertisement decision signal in response to the user device type.

6. The method of claim 1 wherein:
   the type of content desired for the user comprises video as the type of content;
   said decision proxy selecting the first advertisement decision system from the plurality of advertisement decision systems based on video as the type of content desired for the user;

the client metadata comprises a user device type; and
the generating the advertisement decision signal comprises generating the advertisement decision signal in response to the user device type.

7. The method of claim 1 wherein the client metadata comprises metadata regarding a user account.

8. The method of claim 1 wherein the client metadata comprises a billing location.

9. The method of claim 1 wherein the client metadata comprises a location identifier corresponding to a current location of the user device.

10. The method of claim 9 wherein the generating the advertisement decision signal comprises generating the advertisement decision signal in response to the current location of the user device.

11. A system for displaying an advertisement comprising:
a user device generating a selection signal corresponding to content, receiving a manifest file comprising a plurality of chunk location identifiers respectively corresponding to a plurality of content chunks in response to the selection signal, wherein a first chunk location identifier of the plurality of chunk location identifiers corresponds to a first portion of the content, and a second chunk location identifier of the plurality of chunk location identifiers corresponds to a default advertisement;
requesting a first chunk of the content based on the first chunk location identifiers;
a first content delivery network communicating a content stream comprising the first chunk of the content to the user device, wherein the content stream comprises an advertisement queuing point at a predetermined time before an end of the first chunk of the content;
said user device monitoring the content stream for the advertisement queuing point and responsive to reaching the advertisement queuing point, communicating a first advertisement decision query signal comprising client metadata to a decision proxy, said first advertisement decision query signal comprising a first configuration, said client metadata comprising at least one of a user device type, a location of the user device, a billing location and user likes and dislikes;
said decision proxy selecting a first advertisement decision system from a plurality of advertisement decision systems based on a type of content desired for a user, said decision proxy changing the first configuration of the first advertisement decision query signal to a second advertisement decision query signal having a second configuration and communicating the second advertisement decision query signal with the client metadata to the first advertisement decision system located remotely from the user device and decision proxy;
said first advertisement decision system generating an advertisement decision signal comprising an advertisement location identifier corresponding to an advertisement in response to the second advertisement decision query signal and the client metadata and communicating the advertisement decision signal to the decision proxy;
said decision proxy tracking an advertisement corresponding to the advertisement location identifier to form a tracked advertisement;
said decision proxy communicating the advertisement decision signal to the user device; and
said user device replacing the second chunk location identifiers in the manifest with the advertisement location identifier and requesting the advertisement based on the advertisement location identifier from a second content delivery network and receiving and storing at least a portion of the advertisement in a buffer prior to display of the advertisement on a display associated with the user device, wherein the predetermined time before the end of the first chunk of the content is based on allowing enough time for the user device to communicate the first advertisement decision query signal to the decision proxy and receive and store at least the portion of the advertisement in the buffer prior to display of the advertisement on the display associated with the user device.

12. The system as recited in claim 11 wherein the second content delivery network is the first content delivery network.

13. The system as recited in claim 11 wherein the decision proxy selects the first advertisement decision system from one of the plurality of advertisement decision systems based on a plurality of business rules at the decision proxy, wherein the type of content desired for the user is one of the plurality of business rules.

14. The system as recited in claim 11 wherein the first advertisement decision system generates the advertisement decision signal based on the client metadata.

15. The system as recited in claim 11 wherein the first advertisement decision system generates the advertisement decision signal based on the client metadata and business rules.

16. The system of claim 11 wherein:
the client metadata comprises a user device type; and
said first advertisement decision system generating the advertisement decision signal comprises generating the advertisement decision signal in response to the user device type.

17. The system of claim 11 wherein:
the client metadata comprises metadata regarding a user account; and
said first advertisement decision system generating the advertisement decision signal comprises generating the advertisement decision signal in response to the metadata regarding the user account.

18. The system of claim 11 wherein:
the client metadata comprises a billing location; and
said first advertisement decision system generating the advertisement decision signal comprises generating the advertisement decision signal in response to the billing location.

19. The system of claim 11 wherein:
the client metadata comprises a location identifier corresponding to a current location of the user device; and
said first advertisement decision system generating the advertisement decision signal comprises generating the advertisement decision signal in response to the location identifier corresponding to the current location of the user device.

20. A non-transitory machine-readable medium, comprising executable instructions that, when executed by a processing system including a processor, facilitate performance of operations, the operations comprising:
selecting a content at the user device to form a selection signal;
receiving a manifest file comprising a plurality of chunk location identifiers respectively corresponding to a plurality of content chunks at the user device, wherein a first chunk location identifier of the plurality of chunk location identifiers corresponds to a first portion of the content, and a second chunk location identifier of the plurality of chunk location identifiers corresponds to a default advertisement;

requesting, at the user device, a first chunk of the content based on the first chunk location identifier;

communicating a content stream comprising the first chunk of the content to the user device, wherein the content stream comprises an advertisement queuing point at a predetermined time before an end of the first chunk of the content;

monitoring the content stream for the advertisement queuing point at a client stream assembler module of the user device;

responsive to reaching the advertisement queuing point, communicating a first advertisement decision query signal comprising client metadata from the client stream assembler module to a decision proxy, said first advertisement decision query signal comprising a first configuration, said client metadata comprising at least one of a user device type, a location of the user device, a billing location and user likes and dislikes;

selecting, by the decision proxy, a first advertisement decision system from a plurality of advertisement decision systems based on a type of content desired for a user;

changing, at the decision proxy, the first configuration of the first advertisement decision query signal to a second advertisement decision query signal having a second configuration suitable for use by the first advertisement decision system;

communicating the second advertisement decision query signal from the decision proxy to the first advertisement decision system with the client metadata, said first advertisement decision system located remotely from the user device and the decision proxy;

generating an advertisement decision signal comprising an advertisement location identifier at the first advertisement decision system in response to the second advertisement decision query signal and the client metadata;

communicating the advertisement decision signal from the first advertisement decision system to the decision proxy;

tracking, at the decision proxy, an advertisement corresponding to the advertisement location identifier to form a tracked advertisement communicating the advertisement decision signal from the decision proxy to the client stream assembler module;

replacing the second chunk location identifier in the manifest with the advertisement location identifier;

requesting the advertisement based on the advertisement location identifier; and receiving and storing at least a portion of the advertisement in a buffer prior to display of the advertisement on a display associated with the user device, wherein the predetermined time before the end of the first chunk of the content is based on allowing enough time for the user device to communicate the first advertisement decision query signal to the decision proxy and receive and store at least the portion of the advertisement in the buffer prior to display of the advertisement on the display associated with the user device.

\* \* \* \* \*